US011228686B2

(12) United States Patent
Oishi et al.

(10) Patent No.: US 11,228,686 B2
(45) Date of Patent: Jan. 18, 2022

(54) REQUEST PROCESSING APPARATUS AND REQUEST ACCEPTING APPARATUS

(71) Applicant: SONY CORPORATION, Tokyo (JP)

(72) Inventors: Yuki Oishi, Kanagawa (JP); Kenichi Kurihara, Kanagawa (JP); Satoko Asaoka, Kanagawa (JP); Yuriko Kaino, Kanagawa (JP); Aya Shuto, Kanagawa (JP); Isao Takahashi, Kanagawa (JP); Nobukazu Hirai, Kanagawa (JP); Asuka Tejima, Kanagawa (JP); Taichi Takeuchi, Kanagawa (JP); Yusuke Kajio, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/340,559

(22) PCT Filed: Aug. 29, 2017

(86) PCT No.: PCT/JP2017/030940
§ 371 (c)(1),
(2) Date: Apr. 9, 2019

(87) PCT Pub. No.: WO2018/083871
PCT Pub. Date: May 11, 2018

(65) Prior Publication Data
US 2019/0260883 A1    Aug. 22, 2019

(30) Foreign Application Priority Data

Nov. 7, 2016  (JP) .............................. JP2016-217355

(51) Int. Cl.
*H04N 1/00* (2006.01)
*G06K 15/00* (2006.01)
(Continued)

(52) U.S. Cl.
CPC ........... *H04N 1/00143* (2013.01); *G06F 3/12* (2013.01); *G06F 16/53* (2019.01); *G06F 16/58* (2019.01);
(Continued)

(58) Field of Classification Search
CPC ........... H04N 1/00143; H04N 1/00145; H04N 1/0019; H04N 1/00132–00201;
(Continued)

(56) References Cited

U.S. PATENT DOCUMENTS

2002/0001468 A1* 1/2002 Kaku .................. G06F 16/5838
396/310
2008/0246840 A1  10/2008 Larson et al.
(Continued)

FOREIGN PATENT DOCUMENTS

| JP | 2005-182599 A | 7/2005 |
| JP | 2006-185248 A | 7/2006 |
| JP | 2016-086279 A | 5/2016 |

OTHER PUBLICATIONS

International Search Report and Written Opinion of PCT Application No. PCT/JP2017/030940, dated Oct. 10, 2017, 09 pages of ISRWO.

(Continued)

*Primary Examiner* — Paul M Berardesca
(74) *Attorney, Agent, or Firm* — Chip Law Group

(57) ABSTRACT

A request processing apparatus includes a selecting section and an outputting section. The selecting section selects, from multiple pieces of photo data obtained through shooting during an event, one or more pieces of photo data consistent with a request accepted before or during the event. The outputting section outputs the one or more pieces of photo data selected by the selecting section.

5 Claims, 14 Drawing Sheets

(51) Int. Cl.
*G06F 3/12* (2006.01)
*G06Q 50/10* (2012.01)
*G06F 16/58* (2019.01)
*G06F 16/53* (2019.01)
*H04N 101/00* (2006.01)

(52) U.S. Cl.
CPC ............. *G06K 15/00* (2013.01); *G06Q 50/10* (2013.01); *H04N 1/0019* (2013.01); *H04N 1/00153* (2013.01); *H04N 1/00188* (2013.01); *H04N 1/00193* (2013.01); *H04N 2101/00* (2013.01); *H04N 2201/0084* (2013.01)

(58) Field of Classification Search
CPC ......... G06F 16/144; G06F 16/148–152; G06F 16/43; G06F 16/432; G06F 16/434–437; G06F 16/48; G06F 16/483; G06F 16/487; G06F 16/489; G06F 16/53; G06F 16/532; G06F 16/535; G06F 16/58; G06F 16/583–587
See application file for complete search history.

(56) References Cited

U.S. PATENT DOCUMENTS

| | | | |
|---|---|---|---|
| 2010/0017438 A1* | 1/2010 | Haartsen | G06F 16/58 707/E17.009 |
| 2012/0316995 A1* | 12/2012 | Davies | H04N 1/00132 705/26.81 |
| 2013/0222583 A1* | 8/2013 | Earnshaw | H04N 21/47202 348/143 |
| 2013/0232194 A1* | 9/2013 | Knapp | H04L 67/22 709/203 |
| 2015/0149901 A1* | 5/2015 | Otto | G06F 16/4387 715/716 |
| 2016/0073010 A1* | 3/2016 | Cronin | H04N 1/00222 705/39 |
| 2019/0042845 A1* | 2/2019 | Perkins | G06K 9/00671 |

OTHER PUBLICATIONS

Office Action for JP Patent Application No. 2018-548572 dated Jun. 22, 2021, 03 pages of Office Action and 03 pages of English Translation.

* cited by examiner

[ FIG. 1 ]
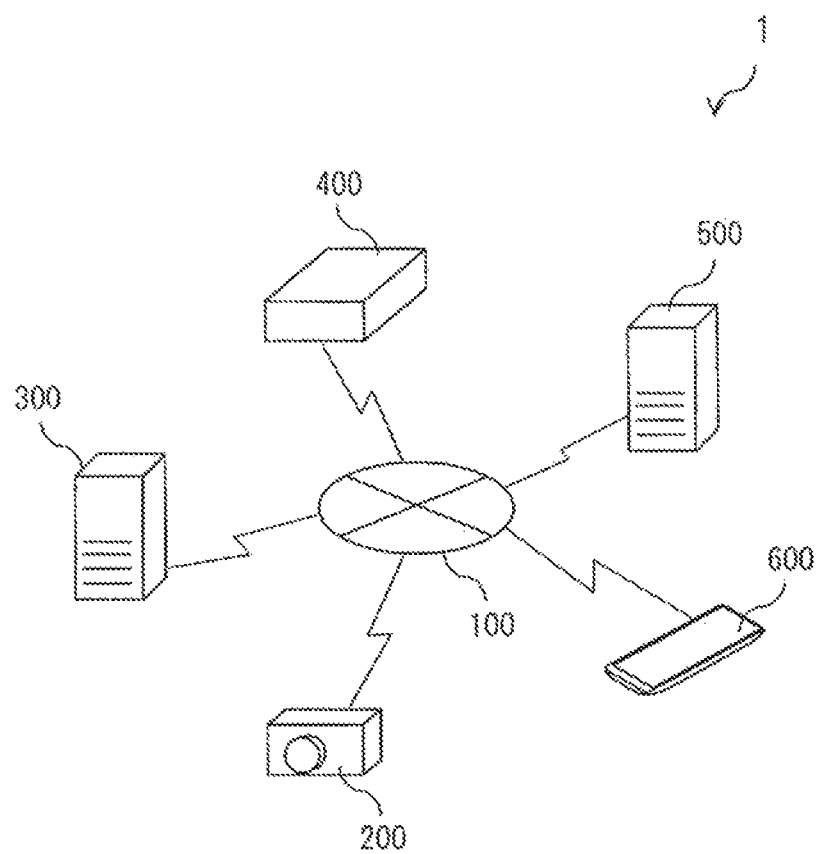

[FIG. 2]
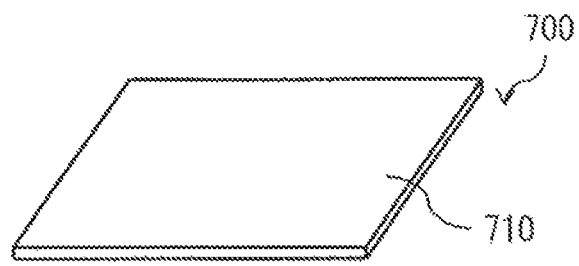
[FIG. 3]
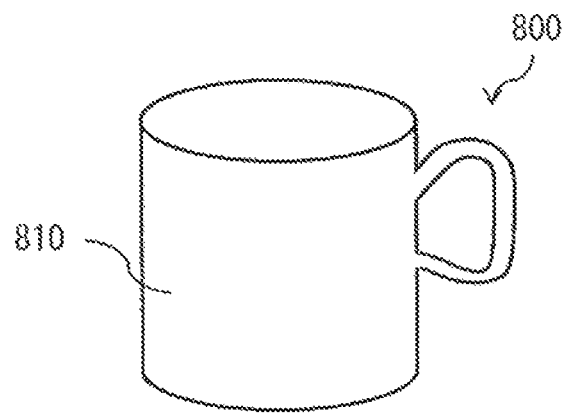
[FIG. 4]
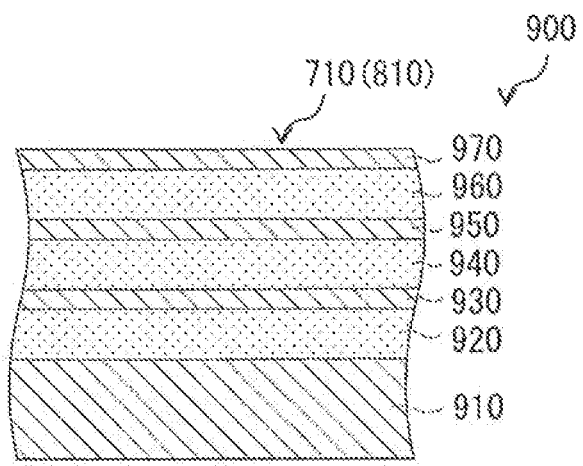

[FIG. 5]
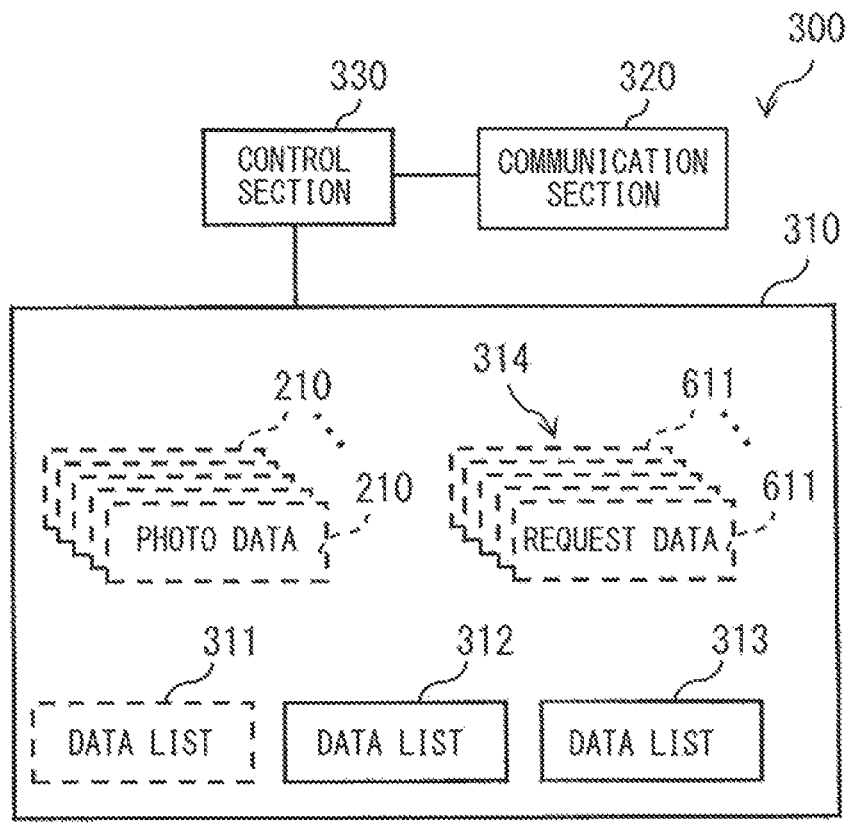
[FIG. 6]
| REQUEST ID | FORM OF GOODS | SHOOTING PLACE | SUBJECT | SONG NUMBER | SONG TITLE |
|---|---|---|---|---|---|
| aaa1 | PHOTO PRINT | kk | ARTIST A | | ...... |
| aaa2 | PHOTO PRINT | pp | ARTIST B | 3 | |
| aaa3 | MUG | mm | ARTIST A | | ...... |
| aaa3 | PHOTO PRINT | mm | ARTIST A | | ...... |
| aaa3 | ROUND FAN | mm | BOTH ARTISTS | | ...... |
| aaa4 | PHOTO PRINT | kk | ARTIST B | | ...... |

[FIG. 7]

| PHOTO ID | FILE NAME | SHOOTING TIME |
|---|---|---|
| 001 | a01 | x01y01 |
| 002 | a02 | x01y02 |
| 003 | b01 | x01y03 |
| 004 | b02 | x01y04 |
| 005 | b03 | x01y05 |
| 006 | c01 | x01y06 |

| FILE NAME | SHOOTING PLACE | SUBJECT |
|---|---|---|
| a | kk | ARTIST A |
| b | mm | ARTIST B |
| c | pp | BOTH ARTISTS |

| TIME SLOT | SONG NUMBER | SONG TITLE |
|---|---|---|
| x01y01~x01y02 | 1 | ...... |
| x01y02~x01y03 | 2 | ...... |
| x01y03~x01y04 | 3 | ...... |
| x01y04~x01y05 | 4 | ...... |
| x01y05~x01y06 | 5 | ...... |
| x01y06~x01y07 | 6 | ...... |

313

[ FIG. 10 ]
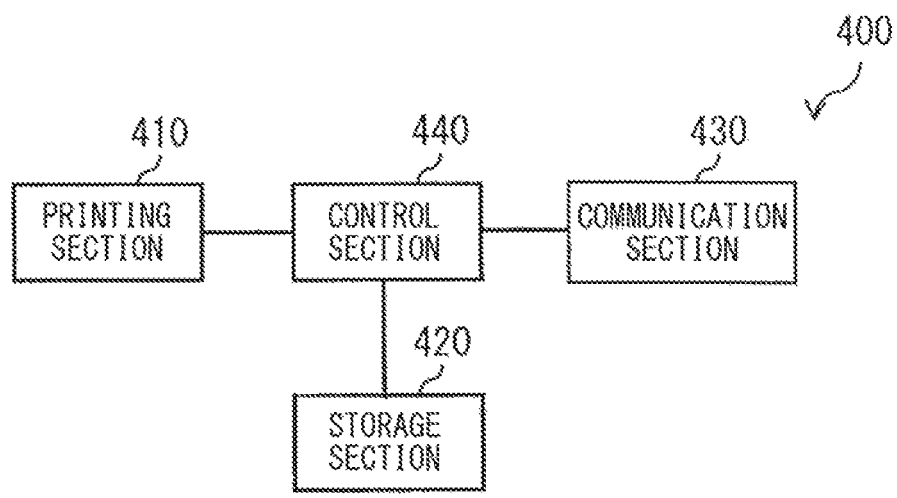
[ FIG. 11 ]
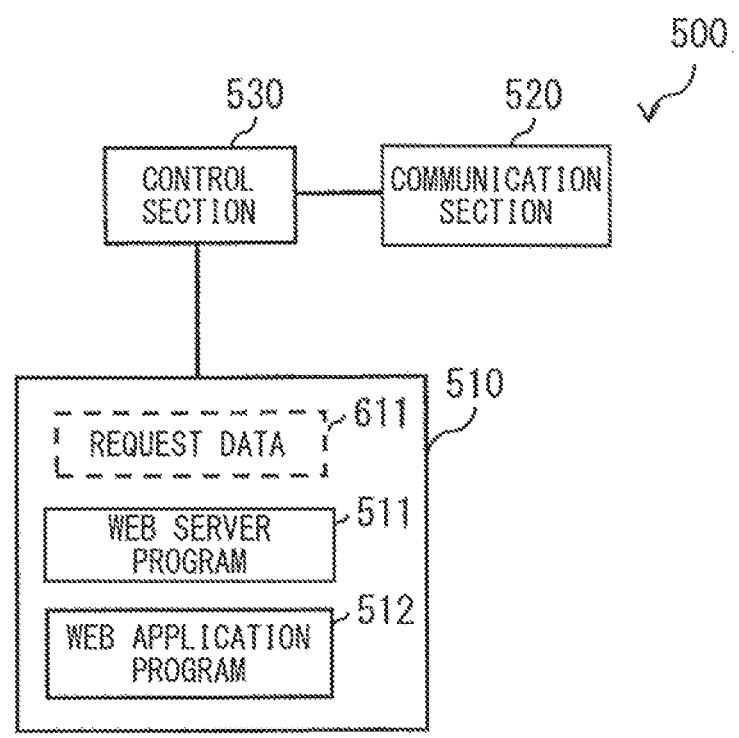

[FIG. 12]
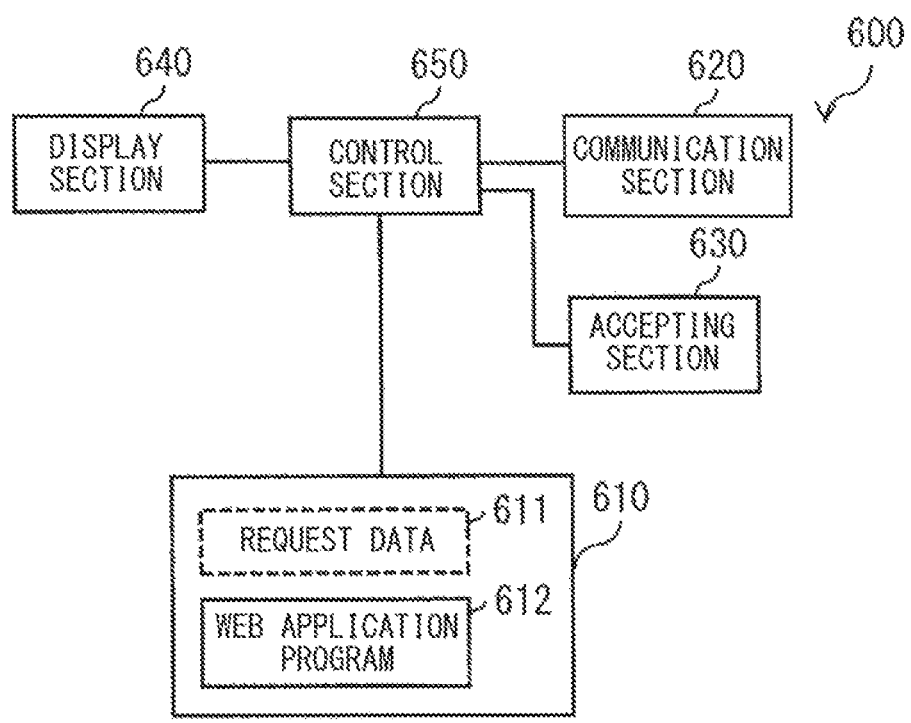

[FIG. 13]
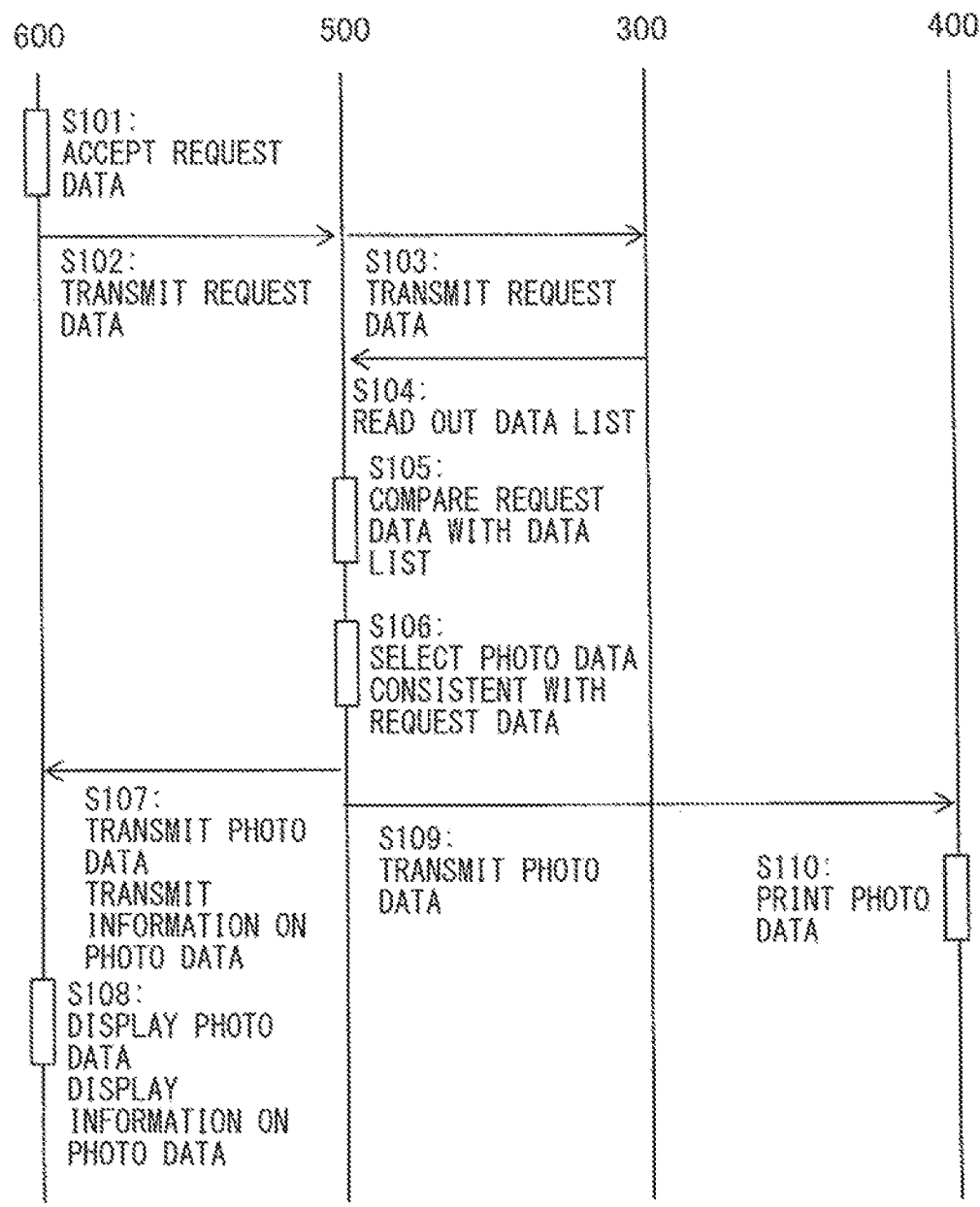

[ FIG. 14 ]
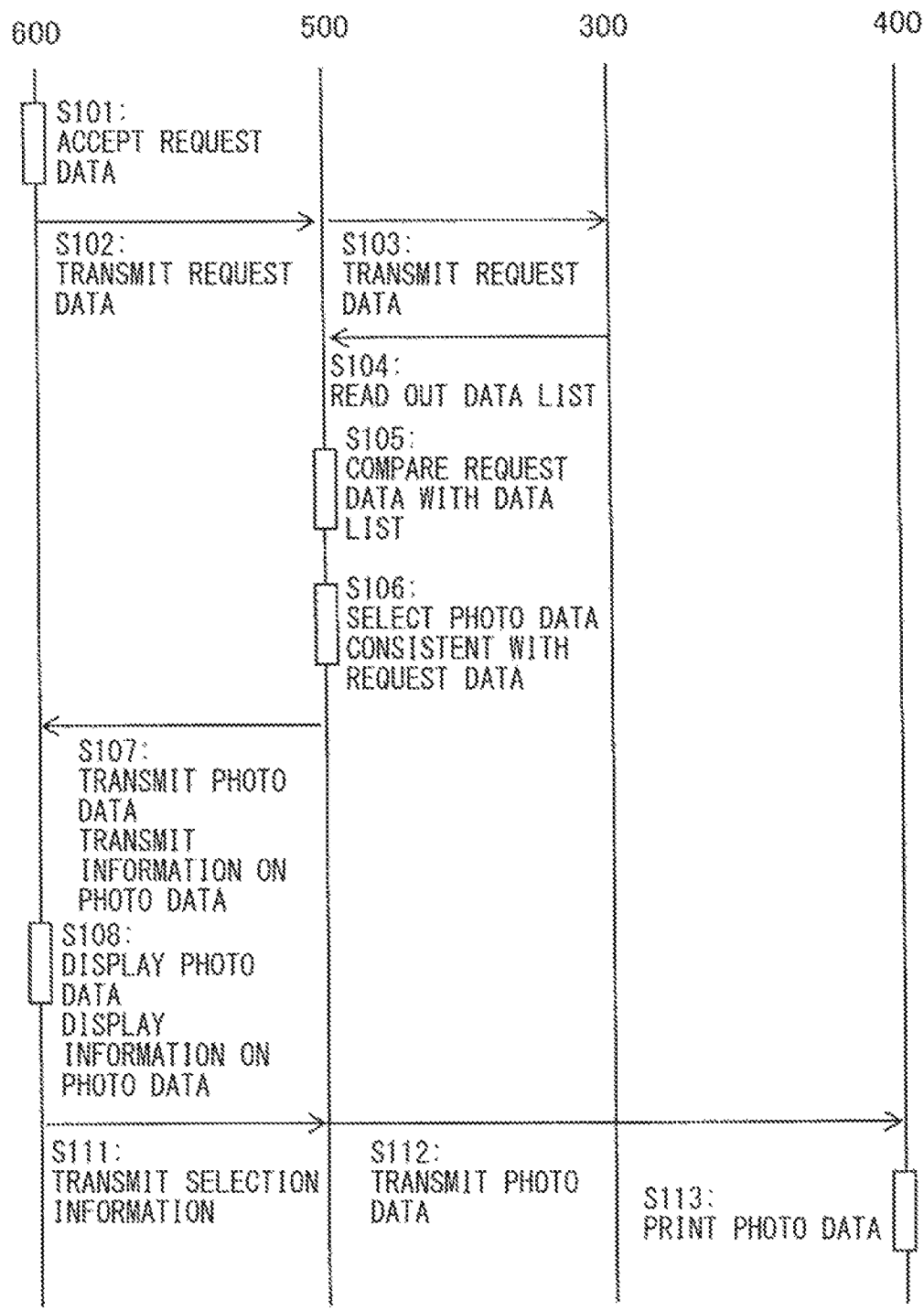

[FIG. 15]
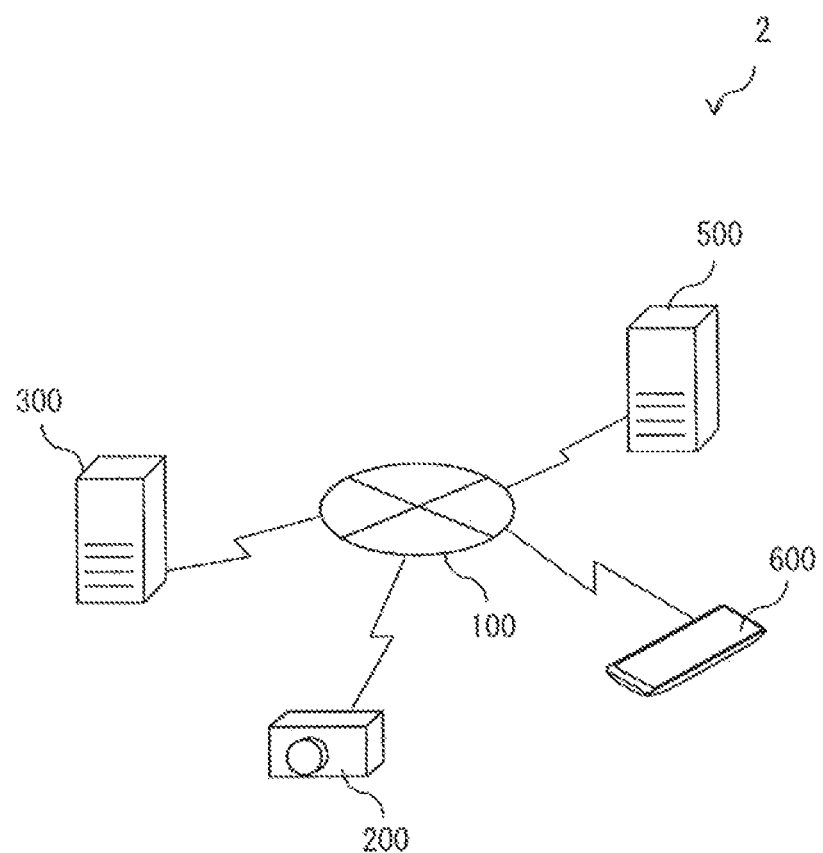

[FIG. 16]
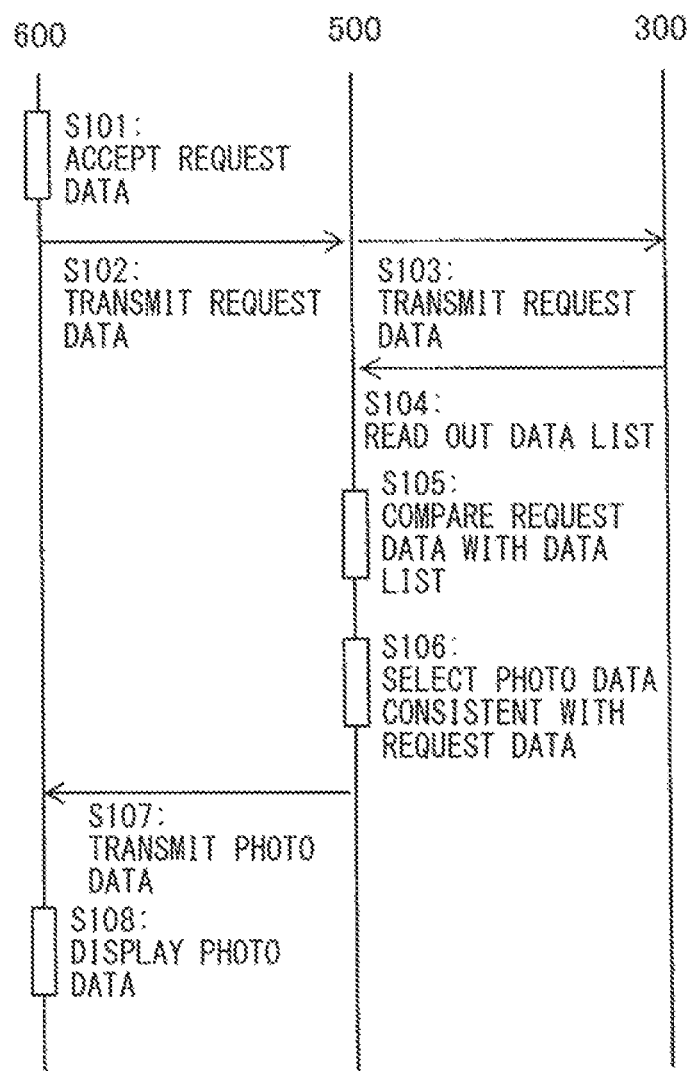

[ FIG. 17 ]
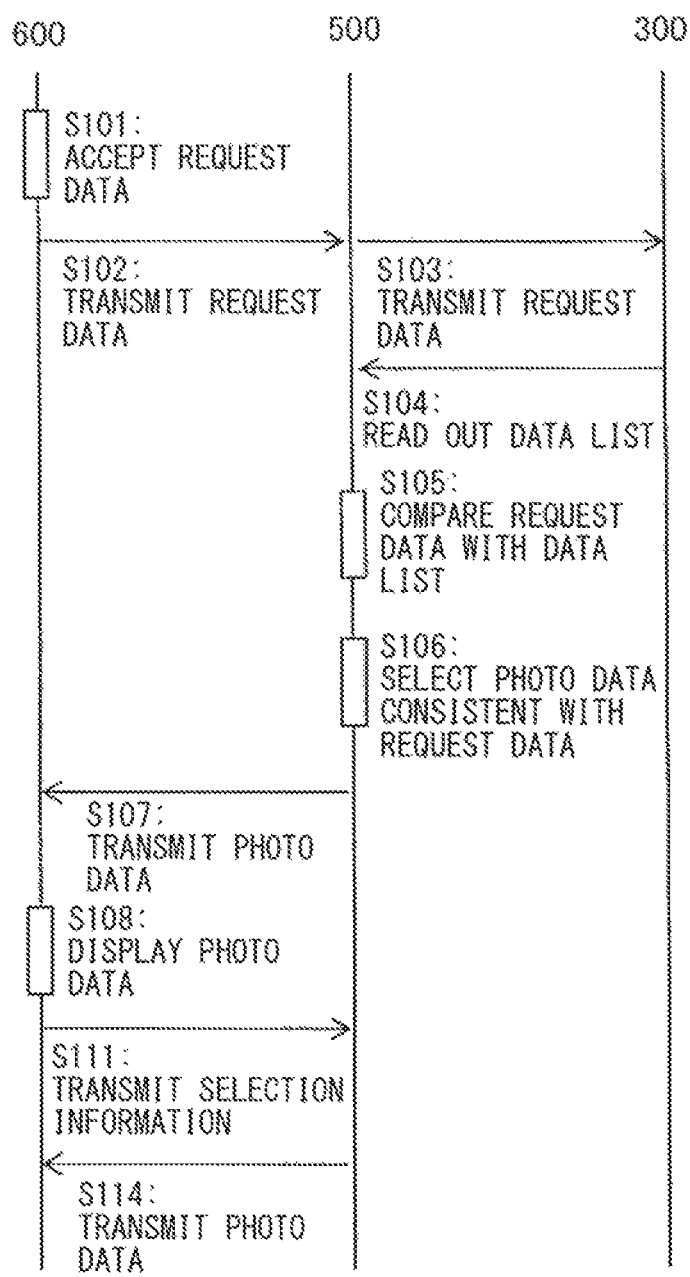

[ FIG. 18 ]
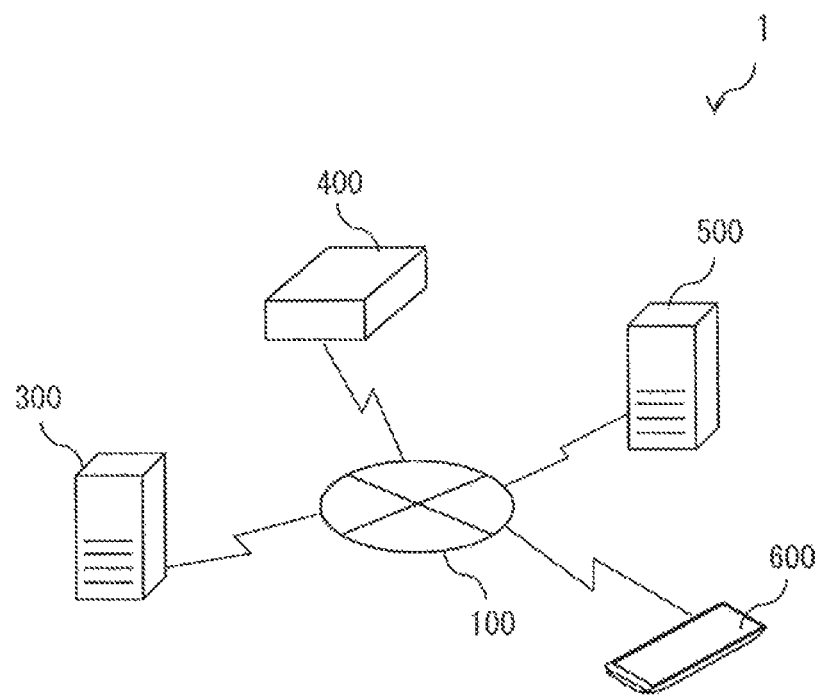

[ FIG. 19 ]
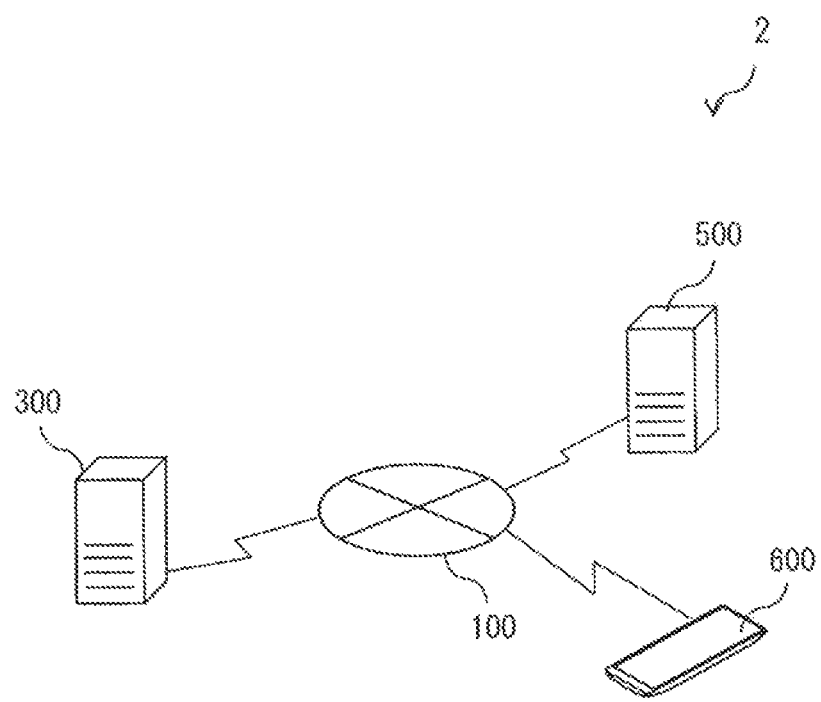

[FIG. 20]
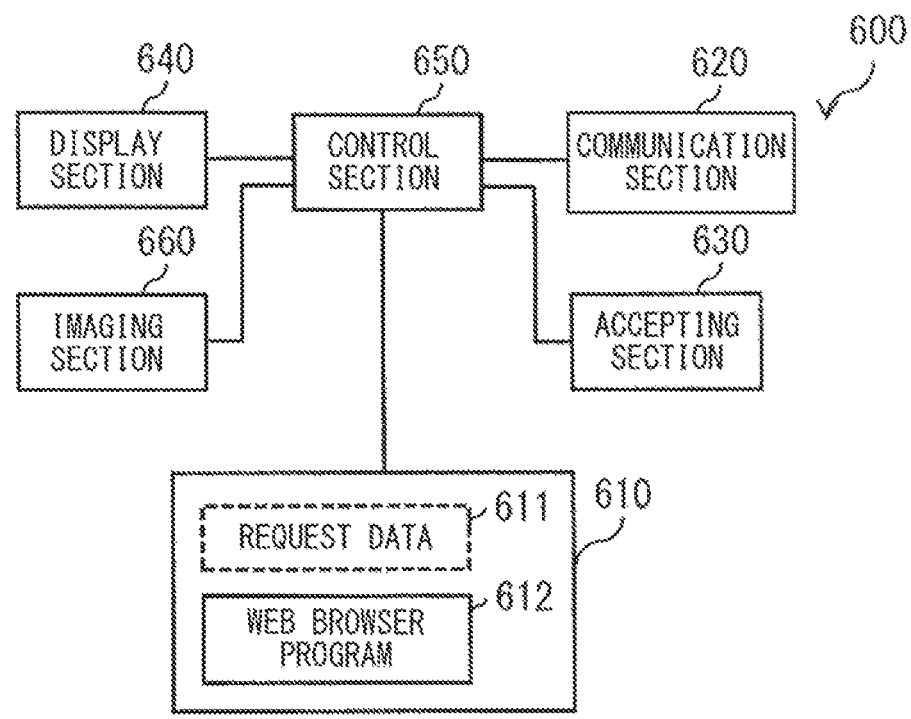

REQUEST PROCESSING APPARATUS AND REQUEST ACCEPTING APPARATUS

CROSS REFERENCE TO RELATED APPLICATIONS

This application is a U.S. National Phase of International Patent Application No. PCT/JP2017/030940 filed on Aug. 29, 2017, which claims priority benefit of Japanese Patent Application No. JP 2016-217355 filed in the Japan Patent Office on Nov. 7, 2016. Each of the above-referenced applications is hereby incorporated herein by reference in its entirety.

TECHNICAL FIELD

The present disclosure relates to a request processing apparatus and a request accepting apparatus.

BACKGROUND ART

In event venues such as live show venues and amusement parks, visitors may sometimes purchase a photo print or goods as a souvenir of their visit. If it is possible for visitors to get prints of photos full of originality that have been shot in a venue of an event or goods with such a photo printed thereon, the visitors are able to retain excitement at the event and a pleasant memory through the photo prints or goods (for example, see NPL 1).

CITATION LIST

Non-Patent Literature

NPL 1: http://guide.usj.co.jp/ja/shop/pc/j#shoplist#photo.do

SUMMARY OF THE INVENTION

However, in an event venue, visitors are allowed to get only photo prints shot at predetermined places, and find difficulty coming across a photo crew in the event venue at a place and situation that they desire. Accordingly, it is not easy for the visitors to get a print or data of a photo that they truly want or goods with the photo printed thereon. It is desirable to provide a request processing apparatus and a request accepting apparatus that make it possible for visitors to easily get a print or data of a photo that they truly want or goods with the photo printed thereon.

A request processing apparatus according to an embodiment of the present disclosure includes a selecting section and an outputting section. The selecting section selects, from multiple pieces of photo data obtained through shooting during an event, one or more pieces of photo data consistent with a request accepted before or during the event. The outputting section outputs the one or more pieces of photo data selected by the selecting section.

In the request processing apparatus according to the embodiment of the present disclosure, one or more pieces of photo data consistent with a request accepted before or during an event are selected from multiple pieces of photo data obtained through shooting during the event. Accordingly, it is possible to obtain desired photo data in accordance with the request.

A request accepting apparatus according to an embodiment of the present disclosure includes an accepting section and a transmitting section. The accepting section accepts, before or during an event, a request regarding one or more pieces of photo data supposed to be obtained through shooting during the event. The transmitting section transmits the request accepted by the accepting section to an external device that selects, from multiple pieces of photo data obtained through the shooting during the event, one or more pieces of photo data consistent with the request accepted by the accepting section.

In the request accepting apparatus according to the embodiment of the present disclosure, a request regarding one or more pieces of photo data supposed to be obtained through shooting during an event is accepted before or during the event, and is transmitted to an external device. Accordingly, it is possible to obtain desired photo data in accordance with the request.

The request processing apparatus and the request accepting apparatus according to the embodiments of the present disclosure make it possible to obtain desired photo data in accordance with a request; therefore, it is possible for a visitor to easily get a photo that he/she truly wants or goods with the photo printed thereon. It is to be noted that the effects described here are not necessarily limitative, and may be any of effects described in this specification.

BRIEF DESCRIPTION OF DRAWINGS

FIG. 1 is a diagram illustrating a schematic configuration example of a request processing system according to a first embodiment of the present disclosure.

FIG. 2 is a perspective view illustrating a configuration example of a printing sheet.

FIG. 3 is a perspective view illustrating a configuration example of a mug.

FIG. 4 is a cross-sectional view illustrating a configuration example of an information recording layer.

FIG. 5 is a diagram illustrating an example of a functional block of a data server unit illustrated in FIG. 1.

FIG. 6 is a diagram illustrating a configuration example of a database illustrated in FIG. 5.

FIG. 7 is a diagram illustrating a configuration example of a data list illustrated in FIG. 5.

FIG. 8 is a diagram illustrating a configuration example of a data list illustrated in FIG. 5.

FIG. 9 is a diagram illustrating a schematic configuration example of a data list illustrated in FIG. 5.

FIG. 10 is a diagram illustrating an example of a functional block of a printer unit illustrated in FIG. 1.

FIG. 11 is a diagram illustrating an example of a functional block of a web server unit illustrated in FIG. 1.

FIG. 12 is a diagram illustrating an example of a functional block of a terminal unit illustrated in FIG. 1.

FIG. 13 is a diagram illustrating an example of the processing procedure of the request processing system illustrated in FIG. 1.

FIG. 14 is a diagram illustrating a modification example of the processing procedure of the request processing system illustrated in FIG. 1.

FIG. 15 is a diagram illustrating a schematic configuration example of a request processing system according to a second embodiment of the present disclosure.

FIG. 16 is a diagram illustrating an example of the processing procedure of the request processing system illustrated in FIG. 15.

FIG. 17 is a diagram illustrating a modification example of the processing procedure of the request processing system illustrated in FIG. 15.

FIG. 18 is a diagram illustrating a modification example of the schematic configuration of the request processing system illustrated in FIG. 1.

FIG. 19 is a diagram illustrating a modification example of the schematic configuration of the request processing system illustrated in FIG. 15.

FIG. 20 is a diagram illustrating an example of a functional block of terminal units illustrated in FIGS. 18 and 19.

MODES FOR CARRYING OUT THE INVENTION

In the following, some embodiments of the present disclosure are described in detail with reference to the drawings. The following description is specific examples of the present disclosure, and the present disclosure is not limited to the aspects described below. It is to be noted that description is given in the following order.
1. First Embodiment
  An example of printing a photo requested by a user in advance
2. Modification Example of First Embodiment
  An example of causing the user to check a photo to be printed before printing the photo
3. Second Embodiment
  An example of transmitting data of a requested photo to a terminal unit
4. Modification Example of Second Embodiment
  An example of causing the user to check data of an ordered photo before placing a formal order
5. Modification Example Common to Embodiments and their Modification Examples
  An example of a camera of the terminal unit being used 1. First Embodiment

[Configuration]

A request processing system 1 according to a first embodiment of the present disclosure is described. FIG. 1 illustrates a schematic configuration example of the request processing system 1 according to the present embodiment. The request processing system 1 is a system that accepts a request from a user before or during an event, and produces a photo print or goods using photo data consistent with content of the accepted request. The event means, for example, an event held in an event venue, such as a live show venue, an amusement park, or a wedding hall. The request includes information regarding the user's demand in a merchandise order. The goods mean, for example, sundries provided in association with a specific event.

The photo print is produced by performing a printing process on, for example, a printing surface 710 of a printing sheet 700 shown in FIG. 2. The goods are produced by performing the printing process on, for example, a printing surface 810 that is a portion of a peripheral surface of a mug 800 shown in FIG. 3. The goods may be produced by performing the printing process on, for example, a printing surface (a surface corresponding to the printing surface 810) provided on a round fan or a calendar instead of the mug 800. The printing surface 810 has, for example, an information recording layer 900 shown in FIG. 4.

The information recording layer 900 is where a variety of information are visibly recorded. The information recording layer 900 includes, for example, a base 910, recording layers 920, 940, and 960, heat insulating layers 930 and 950, and a protective layer 970. The recording layer 920, the heat insulating layer 930, the recording layer 940, the heat insulating layer 950, the recording layer 960, and the protective layer 970 are stacked on the surface of the base 910 in this order.

The base 910 serves as a substrate for forming layers on its surface. The base 910 may or may not transmissive light. In a case where the base 910 does not transmit light, the color of the surface of the base 910 may be, for example, white, or may be any color other than white.

The recording layers 920, 940, and 960 are able to reversibly change their states between a colored state and a decolored state. The recording layers 920, 940, and 960 are configured to differ from one another in color when they are in the colored state. Specifically, in this example, the recording layer 920 is able to exhibit magenta color; the recording layer 940 is able to exhibit cyan color; and the recording layer 960 is able to exhibit yellow color. It is to be noted that the recording layers 920, 940, and 960 are not limited to the foregoing example, and the three recording layers 920, 940, and 960 may have any correspondence relationship to the three colors (magenta, cyan, and yellow). Furthermore, the recording layers 920, 940, and 960 become transparent when they are in the decolored state. Accordingly, the information recording layer 900 allows recording of information using a wide gamut of colors.

The recording layers 920, 940, and 960 each include, for example, leuco dye. In this case, the recording layers 920, 940, and 960 each include, for example, developer, a photothermal conversion material, and a polymer in addition to the leuco dye. The leuco dye is bound to the developer by heat and goes into a colored state, or is separated from the developer and goes into a decolored state. Respective leuco dyes of the three recording layers 920, 940, and 960 differ from one another in color when they are in the colored state. The photothermal conversion material absorbs infrared light and generates heat. Respective photothermal conversion materials of the three recording layers 920, 940, and 960 differ from one another in wavelength of the infrared light that they absorb.

The heat insulating layer 930 serves to make it difficult for heat to be transmitted between the recording layer 920 and the recording layer 940. The heat insulating layer 950 serves to make it difficult for heat to be transmitted between the recording layer 940 and the recording layer 960. The protective layer 970 serves to protect a surface of the information recording layer 900. The heat insulating layers 930 and 950 and the protective layer 970 are made of a transparent material.

The above-described configuration allows a variety of information to be visibly recorded on the printing sheet 700 and the mug 800. Specifically, in a case where information (character(s) or a graphic) is recorded on the information recording layer 900, the information recording layer 900 is irradiated with infrared light on a basis of a character pattern or graphic pattern of the information. A wavelength of this infrared light is set to a wavelength in accordance with a color of the character(s) or graphic that is desired to be recorded. In each of the recording layers 920, 940, and 960, the photothermal conversion material absorbs infrared light of a wavelength corresponding to the photothermal conversion material and generates heat. Thereafter, the leuco dye is bound to the developer by the heat generated by the photothermal conversion material and goes into a colored state, or is separated from the developer and goes into a decolored state. In this way, a variety of information is visibly recorded on the printing sheet 700 and the mug 800. Furthermore, the printing sheet 700 and the mug 800 are able to cause the visibly recorded information to be rewritten.

It is to be noted that the request processing system 1 may be configured to produce a photo print or goods by performing a printing process to apply ink to a printing surface of a printing sheet or goods without the information recording layer 900.

The request processing system 1 includes, for example, one or more imaging units 200, a data server unit 300, a printer unit 400, a web server unit 500, and one or more terminal units 600. The one or more imaging units 200, the data server unit 300, the printer unit 400, the web server unit 500, and the one or more terminal units 600 are coupled to one another through a network 100. The network 100 is, for example, a network through which communication is performed using a communication protocol (TCP/IP) standardly used over the Internet. The network 100 may be, for example, a secure network through which communication is performed using a communication protocol unique to the network. The network 100 is, for example, the Internet, an intranet, or a local area network (LAN). The coupling of the one or more imaging units 200, the data server unit 300, the printer unit 400, the web server unit 500, or the one or more terminal units 600 to the network 100 may be, for example, via a wired LAN, or may be via a wireless LAN such as Wi-Fi, a mobile phone line, or the like.

The one or more imaging units 200 are each held, for example, by a photo crew (a photographer) stationed at a predetermined place in an event venue or by a radio-controlled multicopter-type unmanned aircraft. Example of "the predetermined place in the event venue" include places such as the backstage only organizers are allowed to enter, the sky above the event venue, etc. Each imaging unit 200 outputs photo data 210 obtained through imaging to the data server unit 300 through the network 100.

(Data Server Unit 300)

FIG. 5 illustrates a schematic configuration example of the data server unit 300. The data server unit 300 stores therein, for example, data lists 312 and 313. The data lists 312 and 313 are each a data list for analyzing, for example, respective shooting places of photo data 210 obtained by the one or more imaging units 200, respective subjects included in the photo data 210, situations when respective images of the photo data 210 have been shot, etc.

The data server unit 300 includes, for example, a storage section 310, a communication section 320, and a control section 330. The control section 330 processes information inputted from the outside through the communication section 320, and outputs information read out from the storage section 310 to the outside through the communication section 320. The communication section 320 performs communication with another device through the network 100.

The storage section 310 includes, for example, a nonvolatile memory. For example, the storage section 310 includes an electrically erasable programmable read-only memory (EEPROM), a flash memory, or a resistive random access memory. For example, multiple pieces of photo data 210 inputted from the one or more imaging units 200 are stored in the storage section 310. The photo data 210 include, for example, image data, and additional information and a file name that are added to the image data. This additional information includes, for example, shooting date and time, etc. In the storage section 310, for example, multiple pieces of request data 611 inputted from the one or more terminal units 600 are further stored. The storage section 310 has, for example, a database 314 that is organized as illustrated in FIG. 5 so as to makes it easy to search for data and accumulate data. The multiple pieces of request data 611 are stored, for example, in the database 314.

FIG. 6 illustrates a configuration example of the database 314. FIG. 6 illustrates a configuration example of the database 314 when an event is a live performance of a group consisting of two artists (artist A and artist B). In the following, the database 314 is described on the assumption that the database 314 has the configuration illustrated in FIG. 6. It is to be noted that the database 314 is not limited to the configuration illustrated in FIG. 6.

For example, request identification (ID) for identifying individual request data 611 is added to the request data 611. The request data 611 includes information regarding the user's demand in a merchandise order. Therefore, the request processing system 1 is able to handle acceptance of the request data 611 from the user as a merchandise order. At this time, the request data 611 has an aspect of an order. The request data 611 includes, for example, a form of merchandise, a shooting place, a subject, and at least either a song number or a song title. The form of merchandise is information indicating in which form photo data 210 is commoditized, and includes, for example, information of a photo or goods, etc. Examples of the goods include a mug, a round fan, etc. The shooting place is a shooting place of the photo data 210, and includes, for example, information indicating a specific place in an event venue. The subject is information regarding a subject appeared in a photo of the photo data 210, and includes, for example, the name of an artist (artist A, artist B, or both). The song number indicates what number a song has been played in the live performance. The song title is a title of the song played in the live performance.

In the storage section 310, for example, a data list 311 is further stored. The data list 311 is a data list regarding multiple pieces of photo data 210 obtained through shooting by the one or more imaging units 200 during an event. The data list 311 includes, for example, as illustrated in FIG. 7, photo ID for identifying the individual photo data 210 obtained through shooting by the one or more imaging units 200 during the event. The data list 311 further includes, for example, as illustrated in FIG. 7, a file name and shooting time of photo data 210 assigned to each photo ID.

The file name included in the data list 311 is a file name read out from photo data 210. The file name included in the photo data 210 includes, for example, a unique sign assigned to each imaging unit 200. For example, in the file name included in the photo data 210, the first letter of the file name is a unique sign assigned to each imaging unit 200. The unique sign included in the file name corresponds to a unique sign of the imaging unit 200 that has generated the photo data 210 including the file name. The shooting time included in the data list 311 is information regarding the time at which the photo data 210 has been generated, specifically, shooting time read out from the photo data 210.

The storage section 310 has stored therein, for example, the data lists 312 and 313 in advance. The data list 312 includes, for example, as illustrated in FIG. 8, multiple file names and information regarding a shooting place and a subject that are associated with each of the file names. Each file name included in the data list 312 includes, for example, information regarding the first letter of a file name included in photo data 210. Even in a case where a shooting place and a subject have been fixed in each imaging unit 200, and in a case where the first letter of a file name of photo data 210 is a unique sign assigned to the imaging unit 200, a shooting place of the photo data 210 and a subject in a photo of the photo data 210 are uniquely identified from information regarding the first letter of the file name of the photo data 210.

The data list 313 includes, for example, as illustrated in FIG. 9, time slots and information regarding a song number and a song title that are associated with each of the time slots. Each time slot included in the data list 313 is, for example, information regarding a time slot assigned to each song in the live performance. The song number included in the data list 313 is information regarding what number a song is to be played in the live performance. The song title included in the data list 313 is information regarding a title of the song to be played in the live performance.

(Printer Unit 400)

The printer unit 400 performs a printing process on the basis of a signal inputted from the data server unit 300. The printer unit 400 performs the printing process, for example, on the printing sheet 700 or the printing surface 810 of the mug 800 that has the information recording layer 900. The printer unit 400 may perform, for example, a printing process to apply ink to a printing surface of something without the information recording layer 900.

FIG. 10 illustrates a schematic configuration example of the printer unit 400. The printer unit 400 includes, for example, a printing section 410, a storage section 420, a communication section 430, and a control section 440. The control section 440 includes a processor. The control section 440 outputs, for example, information (print data) inputted from the outside through the communication section 430 to the printing section 410. Furthermore, the control section 440 causes the storage section 420 to store, for example, the information (the print data) inputted from the outside through the communication section 430. The communication section 430 performs communication with another device through the network 100. The printing section 410 perform a printing process, for example, on the basis of the print data inputted from the control section 440. The printing process performed by the printing section 410 includes, for example, a process of irradiating an information recording layer 900 including leuco dye with laser light and a process of applying ink to a printing surface. It is to be noted that in a case where information inputted from the outside through the communication section 430 has not been converted into print data, the control section 440 converts, for example, the information inputted from the outside through the communication section 430 into print data, and outputs the print data to the printing section 410.

(Web Server Unit 500)

FIG. 11 illustrates a schematic configuration example of the web server unit 500. The web server unit 500 provides the user interface of the terminal unit 600, and calculates a result for accepted request data 611. The web server unit 500 includes, for example, a storage section 510, a communication section 520, and a control section 530. The web server unit 500 corresponds to a specific example of a "request processing apparatus" and an "external device" in the present technology.

The communication section 520 performs communication with other units (the data server unit 300, etc.) in the request processing system 1 through the network 100. The storage section 510 includes, for example, a nonvolatile memory. For example, the storage section 510 includes an EEPROM, a flash memory, or a resistive random access memory. The storage section 510 stores therein programs to be executed by the control section 530 (for example, a web server program 511 and a web application program 512), etc. The web application program 512 is an application program used through the network 100. The web application program 512 is caused to run by the web server program 511 and a web browser program 612 to be described later cooperating with each other. The control section 530 includes a processor, and executes, for example, the web server program 511, the web application program 512, etc. stored in the storage section 510. The function of the control section 530 is achieved by the control section 530 executing the web server program 511 and the web application program 512.

Specifically, the control section 530 accepts request data 611 through the terminal unit 600 and the communication section 520 before or during an event. The request data 611 is information inputted to the terminal unit 600 by the user. When having accepted the request data 611, the control section 530 stores the request data 611 in the database 314 of the storage section 310 through a communication section 620. When having accepted the request data 611, the control section 530 also reads out the data lists 311, 312, and 313 from the data server unit 300. The control section 530 reads out the data lists 311, 312, and 313 from the data server unit 300, for example, at predetermined timing after the acceptance of the request data 611. The "predetermined timing" is, for example, the end of the event or timing designated by the user.

The control section 530 selects one or more pieces of photo data 210 consistent with the request data 611 accepted before or during the event from among multiple pieces of photo data 210 obtained through shooting during the event. Specifically, the control section 530 compares the request data 611 accepted before or during the event with the data lists 311, 312, and 313 regarding the multiple pieces of photo data 210 obtained through shooting during the event. The control section 530 compares, for example, information (for example, a shooting place, a subject, a song number, a song title, etc.) included in the request data 611 with information (for example, a shooting place, a subject, a song number, a song title, etc.) associated with respective file names included in the data list 311. The control section 530 reads out, for example, one or more pieces of photo data 210 consistent with the request data 611 that have been found through the comparison from the storage section 310 of the data server unit 300. For example, by reading out the one or more pieces of photo data 210 consistent with the request data 611 from the storage section 310 of the data server unit 300, the control section 530 selects the one or more pieces of photo data 210 consistent with the request data 611.

The control section 530 converts, into print data, the one or more pieces of photo data 210 that has been read out, for example, and outputs the print data obtained through the conversion to the printer unit 400 through the communication section 520. The print data is data written in a script that the printer unit 400 is able to understand. In a case where the printer unit 400 has a function of converting information inputted from the outside into print data, the control section 530 may output the one or more pieces of photo data 210 that has been read out, to the printer unit 400 through the communication section 520, without converting the one or more pieces of photo data 210 into print data.

(Terminal Unit 600)

FIG. 12 illustrates a schematic configuration example of any terminal unit 600. The terminal unit 600 corresponds to a specific example of a "request accepting apparatus" in the present technology.

The terminal unit 600 includes, for example, a storage section 610, a communication section 620, an accepting section 630, a display section 640, and a control section 650. The display section 640 includes, for example, a liquid crystal panel, an organic EL panel, or the like. The accepting section 630 is a user interface of the terminal unit 600, and is, for example, a graphical user interface (GUI) displayed on a display surface of the display section 640. The storage section 610 stores therein programs executed by the control section 650 (for example, the web browser program 612 and an operating system), etc. For example, request data 611 is stored in the storage section 610.

The control section 650 includes a processor, and executes the web browser program 612, the operating system, etc. stored in the storage section 610. The communication section 620 performs communication with other units (the web server unit 500, etc.) in the request processing system 1 through the network 100. The user interface (the accepting section 630) of the terminal unit 600 is achieved, for example, by causing an application (for example, html data) acquired from the web server unit 500 to be processed by the web browser program 612.

The control section 650 accepts an input from the user before and during an event. Specifically, before and during the event, the control section 650 accepts request data 611 regarding one or more pieces of photo data 210 supposed to be obtained through shooting during the event. For example, when accepting the request data 611, the control section 650 may generate an image signal for causing a list as options to be presented (displayed) with respect to each form of merchandise, each shooting place, each subject, each song number, and each song title and output the image signal to the display section 640. Hereinafter, the image signal at this time is referred to as an "image signal for list presentation". At this time, on the basis of the image signal for list presentation inputted from the control section 650, the display section 640 is able to present (display) the list as options with respect to each form of merchandise, each shooting place, each subject, each song number, and each song title. Accordingly, the control section 650 is able to prompt the user to input request data 611. Furthermore, the control section 650 restricts the output of the image signal for list presentation to before or during the event, thereby it is also possible to restrict a period of time in which request data 611 is inputted by the user before or during the event.

The control section 650 transmits the accepted request data 611 to the web server unit 500 through the communication section 620. The control section 650 receives, for example, a result for the request data 611 from the web server unit 500 through the communication section 620. The result for the request data 611 is, for example, information regarding one or more pieces of photo data 210 selected by the web server unit 500 or the one or more pieces of photo data 210 selected by the web server unit 500. The "information regarding one or more pieces of photo data 210" is, for example, a shooting place of the photo data 210, a subject in a photo of the photo data 210, a situation when the photo of the photo data 210 has been shot, etc. The "situation when the photo of the photo data 210 has been shot" is a title or a number of a song being played when the photo of the photo data 210 has been shot, etc.

The control section 650 converts, for example, the received result into an image signal, and outputs the image signal obtained through the conversion to the display section 640. The display section 640 displays the received result on the basis of the image signal inputted from the control section 650. The received result is, for example, information regarding one or more pieces of photo data 210 selected by the web server unit 500 or the one or more pieces of photo data 210 selected by the web server unit 500. The control section 650 transmits information regarding at least one piece of photo data 210 selected by the user on the basis of the received result to the web server unit 500 through the communication section 620.

[Operation]

Subsequently, the processing procedure of the request processing system 1 according to the present embodiment is described. FIG. 13 illustrates an example of the processing procedure of the request processing system 1.

Using the terminal unit 600, the user orders a photo print, photo data, or goods of a specific event. Specifically, first, the user instructs the terminal unit 600 to activate the user interface (the accepting section 630) for ordering a photo print, photo data, or goods of a specific event. Then, the terminal unit 600 (the control section 650) causes an application acquired from the web server unit 500 to be processed by the web browser program 612. Thus, the terminal unit 600 (the control section 650) causes the user interface (the accepting section 630) for ordering the photo print, photo data, or goods of the specific event to be displayed on the display surface of the display section 640. The terminal unit 600 (the accepting section 630) prompts the user to input request data 611 for the specific event. When the user has inputted request data 611 to the accepting section 630, the terminal unit 600 (the accepting section 630) accepts the request data 611 from the user (step S101). At this time, for the terminal unit 600 (the accepting section 630), the request data 611 has an aspect of an order. Then, the terminal unit 600 (the accepting section 630) transmits the accepted request data 611 to the web server unit 500 through the communication section 620 (step S102).

Thereafter, the web server unit 500 (the control section 530) receives the request data 611 through the communication section 520. Then, the web server unit 500 (the control section 530) transmits the received request data 611 to the data server unit 300 through the communication section 520 (step S103). The data server unit 300 (the control section 330) receives the request data 611 through the communication section 320, and stores the request data 611 in the database 314 of the storage section 310. The web server unit 500 (the control section 530) also reads out the data lists 311, 312, and 313 from the data server unit 300 (the storage section 310), for example, at the predetermined timing after the acceptance of the request data 611 (step S104).

Then, the web server unit 500 (the control section 530) compares the request data 611 accepted before or during the event with the data lists 311, 312, and 313 regarding multiple pieces of photo data 210 obtained through shooting during the event. The web server unit 500 (the control section 530) compares, for example, information (for example, a shooting place, a subject, a song number, a song title, etc.) included in the request data 611 with information (for example, a shooting place, a subject, a song number, a song title, etc.) associated with respective file names included in the data list 311 (step S105). The web server unit 500 (the control section 530) selects one or more pieces of photo data 210 consistent with the request data 611 accepted before or during the event that have been found through the comparison from the multiple pieces of photo data 210 obtained through the shooting during the event (step S106). For example, by reading out the one or more pieces of photo data 210 consistent with the request data 611 that have been found through the comparison from the storage section 310 of the data server unit 300, the web server unit 500 (the control section 530) selects the one or more pieces of photo data 210 consistent with the request data 611.

The web server unit 500 (the control section 530) transmits the selected one or more pieces of photo data 210 or information 210A regarding the selected one or more pieces of photo data 210 to the terminal unit 600 through the communication section 520 (step S107). At this time, the web server unit 500 (the control section 530) may transmit, for example, low-resolution photo data obtained by significantly reducing the resolution of the selected one or more pieces of photo data 210 or the selected one or more pieces of photo data 210 with watermark characters such as "SAMPLE" superimposed thereon to the terminal unit 600. The terminal unit 600 (the control section 650) receives the one or more pieces of photo data 210 selected by the web server unit 500 or the information 210A regarding the one or more pieces of photo data 210 selected by the web server unit 500 from the web server unit 500. The terminal unit 600 (the control section 650) converts the one or more pieces of photo data 210 or the information 210A received from the web server unit 500 into an image signal, and outputs the image signal obtained through the conversion to the display section 640. The display section 640 displays the one or more pieces of photo data 210 or the information 210A on the basis of the image signal inputted from the control section 650 (step S108).

The web server unit 500 (the control section 530) instructs the printer unit 400 to print the selected one or more pieces of photo data 210. Specifically, the web server unit 500 (the control section 530) converts the selected one or more pieces of photo data 210 into print data, and outputs the print data obtained through the conversion to the printer unit 400 through the communication section 520 (step S109). Finally, the printer unit 400 performs a printing process on the basis of the inputted print data (step S110). Accordingly, a photo print or goods with the selected photo data 210 printed thereon is produced.

[Effects]

Subsequently, the effects of the request processing system 1 according to the present embodiment are described.

In event venues, such as live show venues and amusement parks, visitors may sometimes purchase a photo print or goods as a souvenir of their visit. If it is possible for visitors to get prints of photos full of originality that have been shot in a venue of an event or goods with such a photo printed thereon, they are able to retain excitement at the event and a pleasant memory through the photo prints or goods.

However, in an event venue, visitors are allowed to get only photo prints shot at predetermined places, and find difficulty coming across a photo crew in the event venue at a place and situation that they desire. Accordingly, it is not easy for the visitors to get a print or data of a photo that they truly want or goods with the photo printed thereon.

Meanwhile, in the request processing system 1 according to the present embodiment, one or more pieces of photo data 210 consistent with request data 611 accepted before or during an event are selected from multiple pieces of photo data 210 obtained through shooting during the event. Accordingly, it is possible to obtain desired photo data 210 in accordance with the request data 611. As a result, it is possible for the user (the visitor) to easily get a photo that he/she truly wants or goods with the photo printed thereon.

Furthermore, in the request processing system 1 according to the present embodiment, the request data 611 regarding the one or more pieces of photo data 210 supposed to be obtained through shooting during the event is accepted before and during the event, and is transmitted to the web server unit 500. Accordingly, it is possible to obtain desired photo data in accordance with the request data 611.

Moreover, the request data 611 accepted before or during the event is compared with the data lists 311, 312, and 313 regarding the multiple pieces of photo data 210 obtained through shooting during the event. Here, the data list 311 includes information that the photo data 210 generally include, and information (for example, a shooting place, a subject, a song number, and a song title) corresponding to the information that the photo data 210 generally include is obtained from the data lists 312 and 313. Accordingly, only by performing simple arithmetic processing, it becomes possible to obtain desired photo data in accordance with the request data 611.

Furthermore, in the request processing system 1 according to the present embodiment, the one or more pieces of photo data 210 consistent with the request data 611 are read out from the storage section 310 of the data server unit 300 by the web server unit 500. Accordingly, the one or more pieces of photo data 210 consistent with the request data 611 are selected; therefore, it is possible to obtain desired photo data 210 in accordance with the request data 611. As a result, it is possible for the user (the visitor) to easily get a photo that he/she truly wants or goods with the photo printed thereon.

Moreover, in the request processing system 1 according to the present embodiment, the web server unit 500 instructs the printer unit 400 to print the one or more pieces of photo data 210 selected by the web server unit 500. Accordingly, it is possible to produce a photo that the user (the visitor) truly wants or goods with the photo printed thereon.

Furthermore, in the request processing system 1 according to the present embodiment, the one or more pieces of photo data 210 selected by the web server unit 500 are received by the terminal unit 600. Accordingly, in the terminal unit 600, it is possible to display the one or more pieces of photo data 210 selected by the web server unit 500; therefore, the user (the visitor) is able to check a photo supposed to be received or a photo printed on goods supposed to be received.

Moreover, in the request processing system 1 according to the present embodiment, information 210A regarding the one or more pieces of photo data 210 selected by the web server unit 500 is received by the terminal unit 600. Accordingly, in the terminal unit 600, it is possible to display the information 210A regarding the one or more pieces of photo data 210 selected by the web server unit 500; therefore, the user (the visitor) is able to check information regarding a photo supposed to be received or information regarding a photo printed on goods supposed to be received.

2. Modification Example of First Embodiment

Subsequently, a modification example of the request processing system 1 according to the foregoing embodiment is described. It is to be noted that, in the following, a component common to the foregoing embodiment is assigned the same reference numeral. Furthermore, description of the component common to the foregoing embodiment shall be omitted accordingly.

FIG. 14 illustrates a modification example of the processing procedure of the request processing system 1. The processing procedure illustrated in FIG. 14 further includes steps S111 to S113 in addition to the processing procedure illustrated in FIG. 13 excluding steps S109 and S110. In the following, the procedure from step S111 and steps subsequent thereto is described. In the present modification example, the request processing system 1 causes the user to check the necessity of printing before the printing using one or more pieces of photo data 210 consistent with request data 611.

At step S108, the terminal unit 600 (the control section 650) prompts the user to order (select) one or more pieces of photo data 210 when the one or more pieces of photo data 210 or information 210A regarding the one or more pieces of photo data 210 is displayed. At this time, the user shall order (select) at least one piece of photo data 210 on the basis of the displayed one or more pieces of photo data 210 or the displayed information 210A regarding the one or more pieces of photo data 210. At this time, the terminal unit 600 (the communication section 620) transmits order information (selection information) regarding one or more pieces of photo data 210 ordered (selected) by the user to the web server unit 500 (step S111).

The web server unit 500 (the control section 530) instructs the printer unit 400 to print the one or more pieces of photo data 210 corresponding to the inputted order information (the selection information). Specifically, the web server unit 500 (the control section 530) converts the one or more pieces of photo data 210 corresponding to the inputted order information (the selection information) into print data, and outputs the print data obtained through the conversion to the printer unit 400 through the communication section 520 (step S112). Finally, the printer unit 400 performs a printing process on the basis of the inputted print data (step S113). Accordingly, a photo print or goods with the selected photo data 210 printed thereon is produced.

In the present modification example, the order information (the selection information) regarding the one or more pieces of photo data 210 ordered (selected) by the user is transmitted to the web server unit 500. Accordingly, a photo that the user (the visitor) truly wants is selected from the one or more pieces of photo data 210 consistent with the request data 611. As a result, it is possible for the user (the visitor) to certainly get a photo that he/she truly wants or goods with the photo printed thereon.

3. Second Embodiment

Subsequently, a request processing system 2 according to a second embodiment of the present disclosure is described.
[Configuration]
FIG. 15 illustrates a schematic configuration example of the request processing system 2 according to the present embodiment. The request processing system 2 is a system that accepts a request from a user before or during an event, and transmits photo data consistent with content of the accepted request to the user's terminal. The request processing system 2 corresponds to a system that the printer unit 400 is omitted from the request processing system 1.
[Operation]
The processing procedure of the request processing system 2 according to the present embodiment is described. FIG. 16 illustrates an example of the processing procedure of the request processing system 1.

Using the terminal unit 600, the user orders photo data of a specific event. Specifically, first, the user instructs the terminal unit 600 to activate the user interface (the accepting section 630) for ordering photo data of a specific event. Then, the terminal unit 600 (the control section 650) causes an application acquired from the web server unit 500 to be processed by the web browser program 612. Thus, the terminal unit 600 (the control section 650) causes the user interface (the accepting section 630) for ordering the photo data of the specific event to be displayed on the display surface of the display section 640. The terminal unit 600 (the accepting section 630) prompts the user to input request data 611 with respect to the specific event. When the user has inputted request data 611 to the accepting section 630, the terminal unit 600 (the accepting section 630) accepts the request data 611 from the user (step S101). At this time, for the terminal unit 600 (the accepting section 630), the request data 611 has an aspect of an order. Then, the terminal unit 600 (the accepting section 630) transmits the accepted request data 611 to the web server unit 500 through the communication section 620 (step S102).

The subsequent processes (steps S103 to S106) in the web server unit 500 (the control section 530) and the data server unit 300 (the control section 330) are similar to the processes (steps S103 to S106) in the foregoing embodiment.

The web server unit 500 (the control section 530) transmits the selected one or more pieces of photo data 210 to the terminal unit 600 through the communication section 520 (step S107). The terminal unit 600 (the control section 650) receives the one or more pieces of photo data 210 selected by the web server unit 500 from the web server unit 500. The terminal unit 600 (the control section 650) converts the one or more pieces of photo data 210 received from the web server unit 500 into an image signal, and outputs the image signal obtained through the conversion to the display section 640. The display section 640 displays the one or more pieces of photo data 210 or information 210A regarding the basis of the image signal inputted from the control section 650 (step S108).
[Effects]
In the request processing system 2 according to the present embodiment, one or more pieces of photo data 210 consistent with request data 611 accepted before or during an event are selected from multiple pieces of photo data 210 obtained through shooting during the event. Accordingly, it is possible to obtain desired photo data 210 in accordance with the request data 611. As a result, it is possible for the user (the visitor) to easily get data of a photo that he/she truly wants. Furthermore, in the request processing system 2 according to the present embodiment, it is possible to achieve effects similar to the effects of the request processing system 1 according to the foregoing embodiment.

Moreover, in the request processing system 2 according to the present embodiment, the one or more pieces of photo data 210 selected by the web server unit 500 are received by the terminal unit 600. Accordingly, it is possible for the user to obtain the one or more pieces of photo data 210 selected by the web server unit 500. As a result, it is possible for the user (the visitor) to easily get data of a photo that he/she truly wants.

4. Modification Example of Second Embodiment

Subsequently, a modification example of the request processing system 2 according to the above-described second embodiment is described. In the following, a component common to the above-described second embodiment is assigned the same reference numeral. Furthermore, description of the component common to the above-described second embodiment shall be omitted accordingly.

FIG. 17 illustrates a modification example of the processing procedure of the request processing system 2. The processing procedure illustrated in FIG. 17 further includes step S111 in addition to the processing procedure illustrated in FIG. 16. In the following, the procedure at step S111 is described. In the present modification example, the request processing system 2 causes the user to select one or more pieces of photo data 210 that he/she deems necessary from the one or more pieces of photo data 210 received from the web server unit 500.

In the present modification example, the web server unit 500 (the control section 530) transmits low-resolution photo data obtained by significantly reducing the resolution of the selected one or more pieces of photo data 210 or the selected one or more pieces of photo data 210 with watermark characters such as "SAMPLE" superimposed thereon to the terminal unit 600 (step S107). In the following, the one or more pieces of photo data 210 that the web server unit 500 (the control section 530) has transmitted to the terminal unit 600 are referred to as the "one or more pieces of photo data 210'".

At step S108, the terminal unit 600 (the control section 650) prompts the user to order (select) one or more pieces of photo data 210 when the one or more pieces of photo data 210' is displayed. At this time, the user shall order (select) at least one piece of photo data 210 on the basis of the displayed one or more pieces of photo data 210'. At this time, the terminal unit 600 (the communication section 620) transmits order information (selection information) regarding one or more pieces of photo data 210 ordered (selected) by the user to the web server unit 500 (step S111). The web server unit 500 (the control section 530) transmits the one or more pieces of photo data 210 corresponding to the inputted order information (the selection information) to the terminal unit 600 (step S114). Accordingly, the one or more pieces of photo data 210 selected by the user are obtained.

In the present modification example, the order information (the selection information) regarding the one or more pieces of photo data 210 ordered (selected) by the user is transmitted to the web server unit 500. Accordingly, a photo that the user (the visitor) truly wants is selected from the one or more pieces of photo data 210 consistent with the request data 611. As a result, it is possible for the user (the visitor) to certainly get a photo that he/she truly wants or goods with the photo printed thereon.

5. Modification Example Common to Above-Described Embodiments and their Modification Examples In the above-described embodiments and their modification examples, for example, the imaging unit 200 may be omitted as illustrated in FIGS. 18 and 19. However, in this case, the terminal unit 600 includes an imaging section 660 corresponding to the imaging unit 200 as illustrated in FIG. 20. In a case where the terminal unit 600 is provided with the imaging section 660 corresponding to the imaging unit 200 in this way, the user himself/herself acquires multiple pieces of photo data 210 by using the imaging section 660. In the present modification example, effects similar to those of the above-described embodiments and their modification examples are obtained.

As above, the present disclosure is described with the embodiments and their modification examples; however, the present disclosure is not limited to the above-described embodiments, etc., and various modifications are possible. It is to be noted that the effects described in this specification are merely an example. The effects of the present disclosure are not limited to those described in this specification. The present disclosure may have effects other than those described in this specification.

Furthermore, for example, the present disclosure may have the following configurations.

(1)
A request processing apparatus including:
a selecting section that selects, from multiple pieces of photo data obtained through shooting during an event, one or more pieces of photo data consistent with a request accepted before or during the event; and
an outputting section that outputs the one or more pieces of photo data selected by the selecting section.

(2)
The request processing apparatus according to (1), further including a comparing section that makes a comparison of the request accepted before or during the event with a data list regarding the multiple pieces of photo data obtained through the shooting during the event,
in which the selecting section selects, from the multiple pieces of photo data obtained through the shooting during the event, one or more pieces of photo data consistent with the request that have been found through the comparison made by the comparing section.

(3)
The request processing apparatus according to (2), in which the selecting section selects the one or more pieces of photo data consistent with the request by reading out the one or more pieces of photo data consistent with the request from a storage section that stores therein the multiple pieces of photo data obtained through the shooting during the event.

(4)
The request processing apparatus according to any one of (1) to (3), in which the outputting section issues an instruction to print the one or more pieces of photo data selected by the selecting section.

(5)
A request accepting apparatus including:
an accepting section that accepts, before or during an event, a request regarding one or more pieces of photo data supposed to be obtained through shooting during the event; and
a transmitting section that transmits the request accepted by the accepting section to an external device that selects, from multiple pieces of photo data obtained through the shooting during the event, one or more pieces of photo data consistent with the request accepted by the accepting section.

(6)
The request accepting apparatus according to (5), further including a receiving section that receives the one or more pieces of photo data selected by the external device.

(7)
The request accepting apparatus according to (5), further including a receiving section that receives information regarding the one or more pieces of photo data selected by the external device.

(8)
The request accepting apparatus according to (6), in which the transmitting section transmits, to the external device, information regarding at least one piece of photo data selected on the basis of the one or more pieces of photo data received by the receiving section.

(9)
The request accepting apparatus according to (7), in which the transmitting section transmits, to the external device, information regarding at least one piece of photo data selected on the basis of the information regarding the one or more pieces of photo data received by the receiving section.

This application claims the benefit of Japanese Priority Patent Application JP2016-217355 filed with the Japan Patent Office on Nov. 7, 2016, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A request processing apparatus, comprising:
circuitry configured to:
obtain a plurality of pieces of photo data from a first external device, wherein the first external device obtains the plurality of pieces of photo data during an event;
accept a request associated with the event, wherein the request includes song information and commodity information, wherein the commodity information corresponds to a form of merchandise associated with commoditization of the plurality of pieces of photo data;
read a plurality of data lists associated with the obtained plurality of pieces of photo data, wherein
one of the plurality of data lists includes a plurality of time slots and respective song information for each of the plurality of time slots,
the plurality of data lists is read based on the accepted request, and
the plurality of data lists is read at one of a time corresponding to an end of the event or a time based on a user input;
compare the accepted request with the read plurality of data lists;
select at least one piece of photo data from the obtained plurality of pieces of photo data based on the comparison of the accepted request with the read plurality of data lists;
output the selected at least one piece of photo data to a second external device; and
issue an instruction to the second external device, wherein the issued instruction corresponds to a print operation of the selected at least one piece of photo data on the form of merchandise included in the request.

2. A request accepting apparatus, comprising:
circuitry configured to:
accept a request associated with a plurality of pieces of photo data, wherein the plurality of pieces of photo data is associated with an event;
receive, based on the request, situation information and commodity information associated with the plurality of pieces of photo data, wherein
the commodity information corresponds to a form of merchandise associated with commoditization of the plurality of pieces of photo data,
the situation information includes song information, and
the song information includes one of a title of a song or a number of the song;
transmit the request to a first external device based on the situation information and the commodity information, wherein
the first external device selects at least one piece of photo data from the plurality of pieces of photo data based on the request and a plurality of data lists, and
one of the plurality of data lists includes a plurality of time slots and respective song information for each of the plurality of time slots; and
issue an instruction to a second external device based on the selected at least one piece of photo data, wherein the issued instruction corresponds to a print operation of the selected at least one piece of photo data on the form of merchandise.

3. The request accepting apparatus according to claim 2, wherein the circuitry is further configured to receive the at least one piece of photo data selected by the first external device.

4. The request accepting apparatus according to claim 3, wherein the circuitry is further configured to transmit information associated with the at least one piece of photo data to the first external device.

5. The request processing apparatus according to claim 1, wherein the form of merchandise includes one of a mug, a round fan, or a calendar.

* * * * *